May 16, 1933.  H. W. ANDERSON  1,909,852
BATHTUB WASTE
Filed June 15, 1931
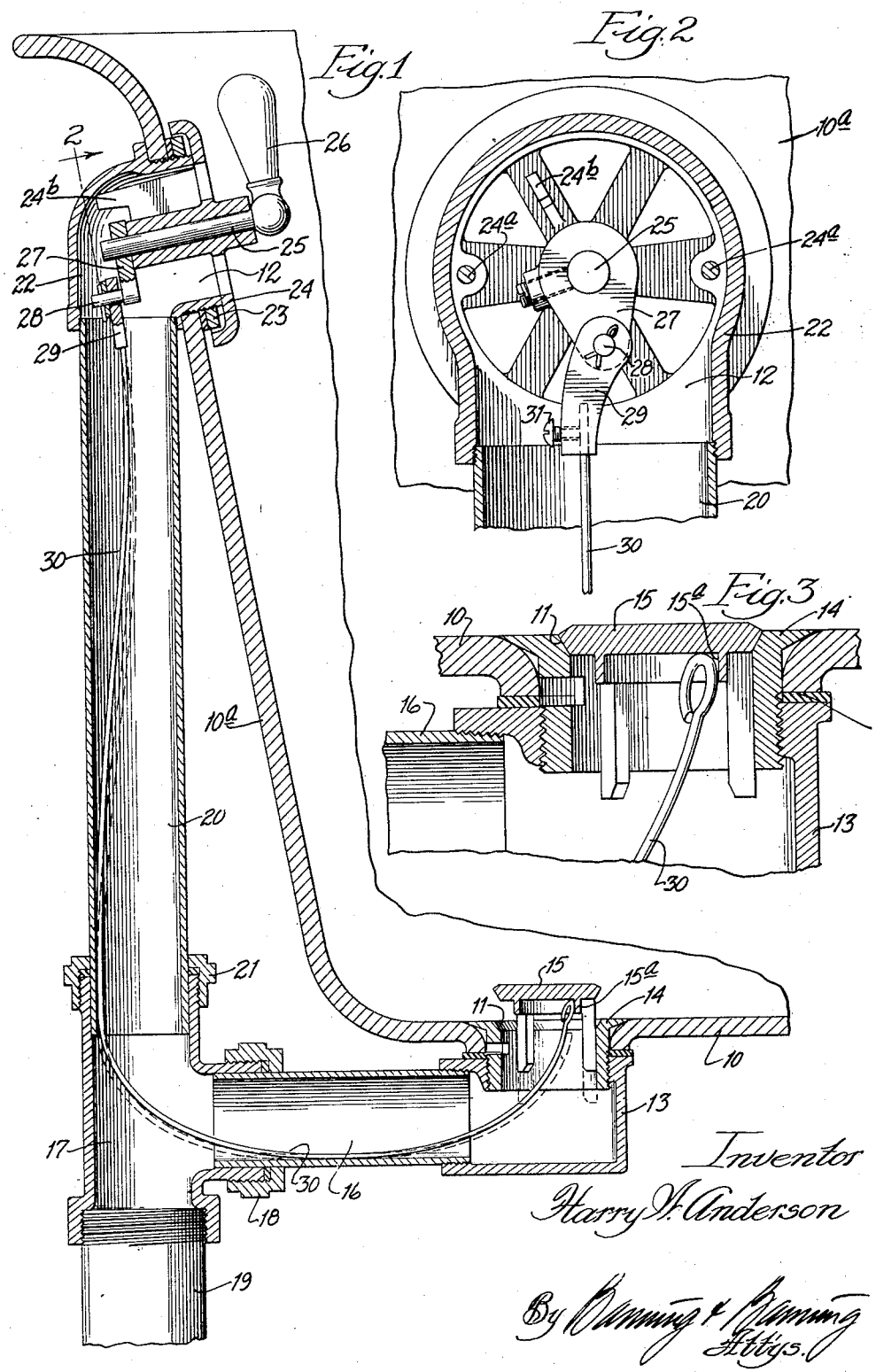
Inventor
Harry W. Anderson
By Banning & Banning
Attys.

Patented May 16, 1933

1,909,852

UNITED STATES PATENT OFFICE

HARRY W. ANDERSON, OF CHICAGO, ILLINOIS

BATHTUB WASTE

Application filed June 15, 1931. Serial No. 544,381.

An object of this invention is to provide a simplified form of bath tub waste which has few moving parts, and which will not readily get out of order.

Another object is to provide an operating means for the valve which can be inserted or withdrawn entirely through one of the waste or overflow openings, thereby permitting the bath tub to be enclosed on its ends and sides.

These and other objects, as will hereinafter appear, are accomplished by this invention which is fully described in the following specification and shown in the accompanying drawing, in which—

Figure 1 is a vertical section through one end of a bath tub waste embodying the invention;

Fig. 2 is an enlarged section on the line 2 of Fig. 1; and

Fig. 3 is an enlarged section through the waste valve showing the same closed.

The embodiment illustrated comprises a bath tub having a bottom 10 and side walls $10^a$ in which are openings for waste and overflow outlets 11 and 12, respectively. The outlet 11 comprises an L-shaped fitting 13, into the upper portion of which is screwed a valve seat 14 which extends through the opening in the bottom of the tub. A suitable valve 15 is slidably mounted to fit in the seat 14.

A waste pipe 16 is screwed, or otherwise secured in the side of the fitting 13, and is slidably mounted in the leg of a T-fitting 17 and is adjustably secured therein by means of a nut 18 and suitable packing. The T-shaped fitting 17 is connected at the bottom to a drain pipe 19, and has an overflow pipe 20 secured in the upper run of the fitting 17 by means of a nut 21 in the same manner as the pipe 16 is secured in the leg.

The overflow pipe 20 is screwed, or otherwise secured into one leg of an L 22, the other leg extending through the opening in the side of the bath tub, and having a nut 23 for securing the same therein. An escutcheon or enclosure plate 24 is secured within the horizontal leg of the L 22 by means of screws $24^a$, or the like, and carries a suitable bearing in which is journaled an operating shaft 25. This shaft is provided on its outer end with a suitable operating lever 26, and on the inner end with a crank 27, to which is secured a crank pin 28. On this pin is loosely mounted an eye 29, and to this is secured a wire thrust member 30 by means of a screw 31.

This wire thrust member is of a generally J-shape and extends down through the overflow pipe 20, is curved to pass through the waste pipe 16 and up into contact with the bottom portion of the valve 15, which has a circular ledge $15^a$ by which the upper end of the thrust member 30 is retained.

The operation of the device is as follows: With the operating lever 26 raised as shown, the eye 29 and the thrust member 30 are forced down, thereby causing transmitting a thrust throughout the length of the member 30 and lifting the valve 15. On lowering the operating lever 26, however, the eye 29 and the thrust member 30 are raised, thereby withdrawing this member and permitting the valve 15 to fall by gravity. The crank 27 on being raised strikes a stop $24^b$.

To withdraw the thrust member 30 the two screws $24^a$ are removed, after which the plate 24, together with its shaft 25, are rocked and drawn out through the side leg of the L 22. The wire thrust member 30 bends sufficiently to permit this, and this member can then be withdrawn into the bath tub through the L 22. To insert these parts the lower end of the wire thrust member 30 is inserted through the L 22 and into the vertical overflow pipe 20, and is forced down keeping the curved portion of the thrust member 30 in the general position here shown, so that it will follow easily through the T-shaped fitting 17 into the horizontal waste pipe 16 and finally up into the waste outlet, where it will encounter the valve 15. The plate 24 is then secured in place by means of screws $24^a$.

If there is difficulty in getting the lower end of the member 30 into the opening in the valve seat 14, the valve 15 may be removed and the operator's finger introduced into the end of the waste pipe 16 to guide the forward end of the member 30 into place.

In a full size embodiment of this invention it is found that this thrust member can be made of a wire which is stiff enough to provide the necessary thrust, and which at the same time is flexible enough to permit of ready insertion and withdrawal of the same from the waste and overflow pipes.

One advantage of this device over others now in common use is that it provides a yieldable member for lifting the valve 15 which permits the latter to be stepped on when the valve is in the raised position without any injury whatever to the parts. In this event, the thrust member 13 yields to close under pressure on the valve, and when that pressure is removed immediately acts to lift the valve again.

While I have shown and described but a single embodiment of my invention, it is to be understood that it is capable of many modifications. Changes, therefore, in the construction and arrangement may be made which do not depart from the spirit and scope of the invention as disclosed in the appended claims.

I claim:

1. A bath tub having an overflow outlet in the side of the tub and a waste outlet in the bottom of the tub, a waste pipe connected to the waste outlet, an overflow pipe connected to the waste pipe, an L connecting the overflow pipe to the overflow outlet, a valve mounted adjacent the waste outlet, an operating member adjacent the overflow outlet, and a flexible wire member connected to the operating member and insertable through and removable from the overflow outlet, said wire member extending through and cooperating with angularly disposed inner surface portions of said waste and overflow pipes into engagement with the valve for lifting it off its seat by a thrust.

2. In combination with a bath tub having waste and overflow outlets, communicating angularly disposed waste and overflow pipes, an L connecting each pipe to one outlet, a valve adapted to close the waste outlet, a deformable unit adapted to be inserted through the overflow outlet and through said pipes, said unit cooperating with angularly disposed inner surface portions of said pipes whereby to raise and lower said valve by a thrust, and means on the overflow outlet for operating said unit to bring the unit into and out of thrust engagement with said surfaces.

3. In combination with a bath tub having waste and overflow outlets, communicating angularly disposed waste and overflow pipes, an L connecting each pipe to one outlet, a valve adapted to close the waste outlet, a flexible wire element adapted to be inserted through the overflow outlet and through said pipes, said element cooperating with angularly disposed inner surface portions of said pipes whereby to raise and lower said valve by a thrust, and means on the overflow outlet for operating said element.

4. In a bath tub waste, a T having a vertical run and a horizontal leg, the leg being connected through a waste pipe to an L, a seat member adapted to secure the L to the waste opening in the bottom of a bath tub, a slide valve in the seat member, the run being connected through an overflow pipe with an elbow adapted to be connected to the overflow outlet in the vertical wall of a bath tub, an integral flexible compression member insertable through the overflow outlet and extending through said pipes and connections to lifting engagement with said valve at one end of said compression member, said compression member cooperating with angularly disposed inner surface portions of said waste and overflow pipes, and an operating member in the overflow outlet connected to the other end of said compression member for actuating the same.

HARRY W. ANDERSON.